United States Patent
Maloy

(12) 
(10) Patent No.: US 6,250,663 B1
(45) Date of Patent: Jun. 26, 2001

(54) SPLIT FRAME FOR HEAVY TRUCKS

(76) Inventor: Clower E. Maloy, 4909 W. Joshua Blvd., Apt. 1064, Chandler, AZ (US) 85226

( * ) Notice: Subject to any disclaimer, the term of this patent is extended or adjusted under 35 U.S.C. 154(b) by 0 days.

(21) Appl. No.: 09/240,087

(22) Filed: Jan. 29, 1999

(51) Int. Cl.$^7$ ................................. B60D 1/00; B60G 7/00
(52) U.S. Cl. ................. 280/492; 280/494; 280/124.111; 280/124.116
(58) Field of Search ................................ 280/491.5, 492, 280/494, 781, 788, 785, 124.111, 124.112, 124.116

(56) References Cited

U.S. PATENT DOCUMENTS

| | | | |
|---|---|---|---|
| 692,064 | 1/1902 | McNutt | 180/349 |
| 792,561 | 6/1905 | Thompson | 180/349 |
| 1,428,713 | 9/1922 | Schoenhard | 180/296 |
| 1,651,888 | 12/1927 | Hellstrand | 280/781 |
| 1,763,767 | 6/1930 | Fageol | 280/680 |
| 2,032,721 | 3/1936 | Schaefer | 280/680 |
| 2,206,359 | 7/1940 | Larison | 280/680 |
| 2,260,574 | 10/1941 | Martin | 280/80.1 |
| 2,373,398 | 4/1945 | Hoobler | 280/423.1 |
| 2,590,388 | 3/1952 | Dornath | 280/404 |
| 3,732,942 * | 5/1973 | Hobbensiefken | 180/11 |
| 3,751,070 * | 8/1973 | Schaffart et al. | 280/432 |
| 3,784,219 * | 1/1974 | Van Der Burgt et al. | 280/104 |
| 3,806,149 | 4/1974 | Huszar | 280/106.5 |
| 4,188,042 | 2/1980 | Pederson et al. | 280/404 |
| 4,358,128 | 11/1982 | Chambers | 280/404 |
| 4,405,144 | 9/1983 | Chambers | 280/404 |
| 4,548,423 * | 10/1985 | Craven | 280/492 |
| 4,711,461 * | 12/1987 | Fromberg | 280/494 |
| 5,078,420 * | 1/1992 | Jable et al. | 280/680 |
| 5,240,273 * | 8/1993 | Stead et al. | 280/494 |
| 5,330,222 | 7/1994 | Halverson et al. | 280/438.1 |
| 5,706,901 * | 1/1998 | Walters et al. | 280/494 |
| 5,709,274 * | 1/1998 | Herbold | 280/494 |
| 5,810,371 * | 9/1998 | Velke | 280/492 |
| 5,857,823 * | 1/1999 | MacEachern | 280/494 |
| 5,873,595 * | 2/1999 | Hinte | 280/494 |
| 5,971,413 * | 10/1999 | El-Kassouf | 280/124.111 |
| 6,032,973 * | 3/2000 | Flowers, Jr. | 280/494 |
| 6,068,275 * | 5/2000 | Chino | 280/124.112 |

\* cited by examiner

Primary Examiner—Brian L. Johnson
Assistant Examiner—Joselynn Y. Sliteris
(74) Attorney, Agent, or Firm—Ellis, Venable & Busam LLP

(57) ABSTRACT

A spit-frame, heavy truck, suspension system for trucks that haul trailers made of three moveably interlocked rigid frames referred to as the front frame, rear frame, and interconnecting frame. The front frame supports the cab, engine, and transmission. The rear primary frame supports the drive axle and fifth wheel. The rear end of the interconnecting frame is pivotally mounted to the rear frame whereby the rear frame may rotate about a transverse axis. The front end of the interconnecting frame is mounted to the front frame in a manner that permits the interconnecting frame to rotate and pivot along its longitudinal axis relative to the front frame. Hydraulic cylinders are used to dampen vibrations and oscillations within this spit-frame structure.

5 Claims, 5 Drawing Sheets

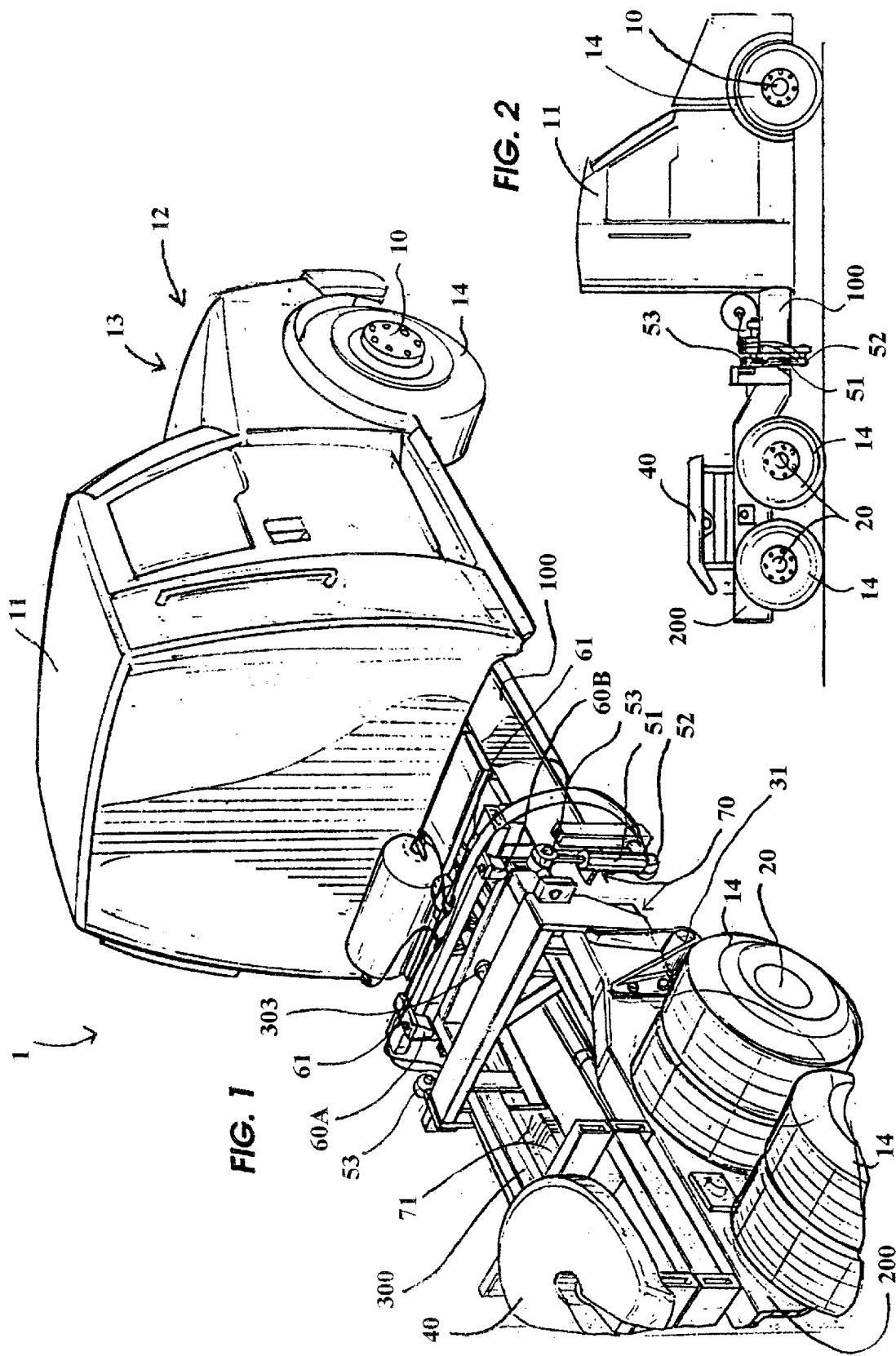

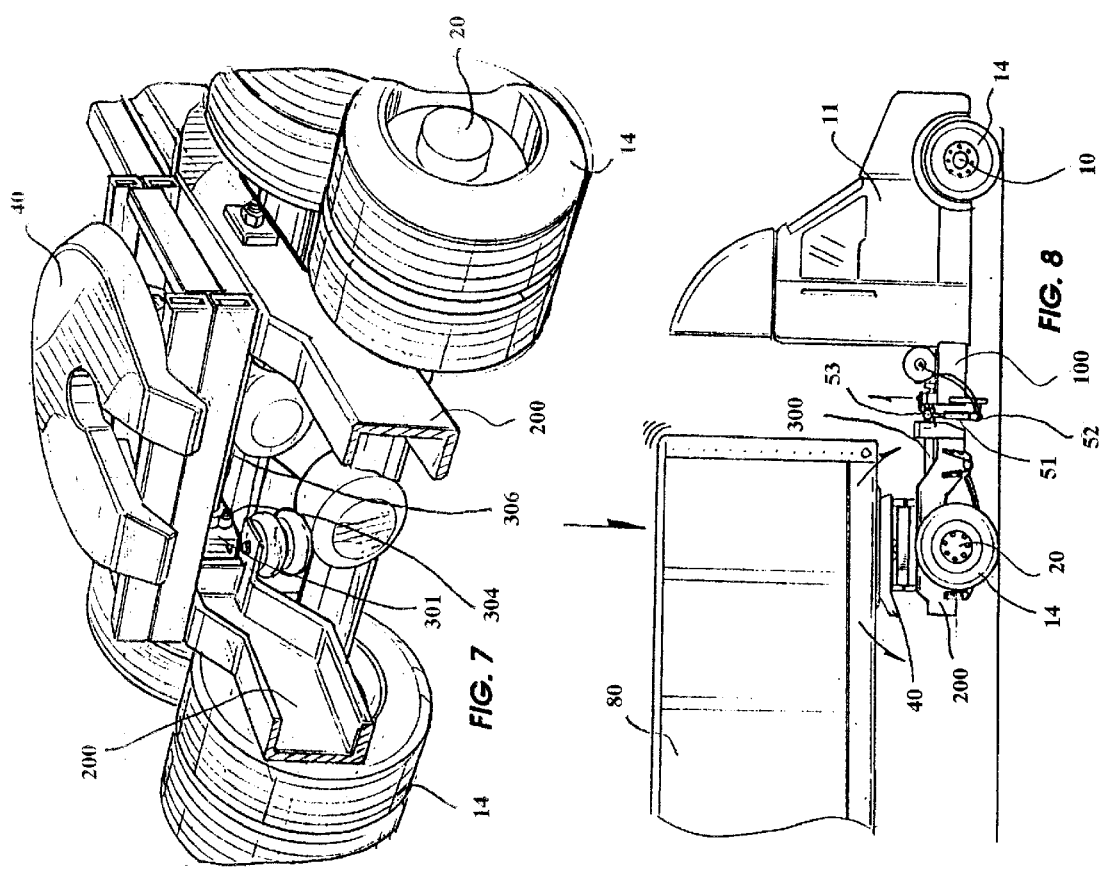

SPLIT FRAME FOR HEAVY TRUCKS

FIELD OF THE INVENTION

The present invention relates to the field of frames for heavy trucks or tractors and more particularly to split-frame structures for heavy trucks designed to reduce the transmission of road vibrations from the trailer to the truck cab.

BACKGROUND

The trucking industry is one of the primary means of transporting goods and equipment in the United States. In 1994, the trucking industry hauled 5.5 billion tons of freight accounting for 55 percent of the total domestic freight volume. To handle this volume of freight, the trucking industry estimates that it will require 300,000 to 500,000 new truck drivers each year. To attract this workforce, and retain the present workforce, the trucking industry is constantly seeking new ways to improve the working conditions and living quality of heavy trucks for its drivers.

Rough roads, railroad crossing, and the like, cause vibrations that are felt by the occupants of the truck's cab. Road vibration is one of the greatest causes for driver fatigue experienced. Vibrations can be transmitted directly from the road surface to the occupants through the suspension of the truck. However, these same vibrations are also transmitted indirectly through the trailer linkages coupling the trailer to the truck.

Heavy truck drivers commonly operate in two person teams. Frequently, while one person is driving the truck, the other person will sleep in a sleeping compartment at the rear of the cab. It is therefore desirable, both for the on-duty driver, and the off-duty driver sleeping, to stabilize the movement of the truck cab and minimize the vibrations and oscillations caused by rough surfaces. One primary method of achieving this goal is through minimizing the transmission of the trailer's vibrations and oscillations to the truck cab. Therefore, there is a current and continuing need for structures and mechanisms that will reduce the amount of road vibration felt by occupants of a truck.

In the current state of heavy truck technology, the truck is comprised of a cab attached to the front end of a single rigid frame. The heavy truck attaches and holds a trailer through a fifth wheel coupler mounted at the rear of the truck frame. The fifth wheel couples the truck frame to the kingpin of the trailer.

When travelling across a road, a truck and trailer will frequently drive over minor road imperfections such as concrete seams and potholes. A road imperfection that is symmetrically impacted by the trailer, such as a concrete seam, will cause the trailer to vibrate vertically, or to rock about a transverse axis. A road imperfection that is asymmetrically impacted by the trailer, such as a single pothole, will cause the trailer to have both a transverse and a longitudinal axis of motion. Due to the trailer's mechanical engagement with the truck, these mechanical vibrations and oscillations of the trailer are transmitted to the truck and the passenger cab. This transmission of vibrations and oscillations to the cab disturbs the smooth ride for the driver and passengers.

There have been truck designs that attempt to minimize the transmission of trailer vibrations and oscillations through pivotally mounting the fifth wheel with ball joints. The motion of the pivotally mounted fifth wheel is then dampened with hydraulic cylinders. In contrast, the present invention utilizes a split-frame system to minimize the transmission of trailer vibrations. This split-frame system reduces the transmission of road vibrations by mounting the front and rear axles of the truck on two separate moveably interlocked frames.

Inventors have developed many other devices that reduce the transmission of road vibrations to the trailer and the truck cab to enhance the ride quality for both the drivers and the freight. Halvorsen et al., U.S. Pat. No. 5,330,222, discloses a frame isolation system which enhances the ride quality of a terminal tractor. This patent discloses a single tractor frame assembly that includes an axle saddle provided with leading and trailing anti-torque links which permit the axle to move through a limited displacement to compensate for rough and uneven road surfaces. In contrast to the present invention, this patent does not teach the mounting of the front and rear axles on separate frames to reduce the transmission of trailer vibrations to the passenger cab.

A flexible joint assembly used in tandem wheel and axle suspensions for suspending a vehicle chassis is disclosed in Jable et al., U.S. Pat. No. 5,078,420. This patent discloses the pivotal mounting of equalizer leaf springs to a chassis side rail. The dual wheels of this device are separately mounted and separately flexible.

A frame/subframe assembly for mounting an engine and rear wheels to a race car chassis is disclosed in Huszr, U.S. Pat. No. 3,806,149. This patent discloses that the racecar engine and rear wheels are mounted to a subframe made of two side rails. The subframe is spring-mounted in the front and pivotally mounted at the rear to the main frame. The subframe is pivotally mounted with bolts to the mainframe at a point below and forward of the rear axle. The stated object of this subframe system is to provide a structure that allows for engine and chassis torque. A further object of this suspension is to provide a wheeled subframe for the engine to facilitate the repair and maintenance on the engine. This patent does not teach the use of a split-frame system, as in the present invention, to reduce the transmission of vibrations between a trailer and a heavy truck cab.

The present state of the art for motor vehicle frame systems fails to teach a heavy truck that includes a split-frame system mounting the front and rear axles on separate frames that reduces the transmission of transverse vibrations from the trailer to the truck cab. In addition, the present state of the art fails to disclose a split-frame system that also reduces the transmission of rotational vibrations from the trailer to the truck cab.

SUMMARY OF THE INVENTION

In accordance with the invention claimed, a novel heavy truck frame system is disclosed that reduces the transmission of the vibrations and oscillations of the trailer along its longitudinal and transverse axes to the truck cab. This heavy truck frame system is comprised of three rigid frames, referred to as the front frame, the rear frame, and the interconnecting frame. The front frame supports the truck cab, front axle, engine, and transmission. The rear frame supports the two rear drive axles and fifth wheel. The fifth wheel couples to the kingpin of the trailer. The interconnecting frame interlocks the front frame to the rear frame in such a manner to permit the rear frame to move relative to the front frame. The interconnecting frame is secured to the front frame in such a manner as to allow the interconnecting frame to pivot or rotate about its longitudinal axis relative to the front frame. A preferred means of securing the interconnecting frame to the front frame that permits this freedom of movement is a bearing guided pivot. The interconnecting frame is rigidly secured to the front frame with respect to all other degrees of freedom. The interconnecting frame is connected with the rear frame through a pair of self-centering bearings. This structure enables the rear frame to pivot or rotate about its transverse axis relative to the front frame. Therefore, the interconnecting frame enables the rear frame to pivot or rotate about is longitudinal axis and rotate about its transverse axis relative to the front frame.

When the rear wheels of a trailer impact a minor road imperfection such as a road seam or pot hole, the trailer will vibrate or oscillate about a transverse axis. Due to the fact that rear frame, having the fifth wheel rigidly mounted thereon, is free to rotate or pivot about its transverse axis relative to the front frame, the transmission of these transverse vibrations or oscillations to the trailer is reduced. When a trailer impacts a minor road obstruction on only one side, the trailer will vibrate or oscillate along its longitudinal axis. Due to the fact that the interconnecting frame enables the rear frame that is coupled to the trailer to rotate about its longitudinal axis relative to the front frame, these longitudinal vibrations are not transferred to the front frame.

In order to control the vibrations and oscillations of the rear frame relative to the front frame, a vibrational dampening system is included. Two hydraulic cylinders are connected to the front and rear frames to dampen the relative vibrations and oscillations between these two frames. These hydraulic cylinders do introduce a small amount of virbational coupling between the front and rear frames.

Enabling the rear frame to pivot and rotate about its transverse and longitudinal axes independent of the front frame reduces the transmission of trailer's vibrations and oscillations to the truck cab. This design therefore provides a smoother ride for those persons riding in the cab.

It is a primary object of the present invention to provide a heavy truck frame system that stabilizes the movement of the truck cab to provide a smooth ride for the driver and passengers.

It is a further object of the invention to provide a split-frame system that minimizes the transmission of the trailer's vertical vibrations to the truck cab.

A still further object of the invention is to provide a split-frame system that minimizes the transmission of the trailer's rotational vibrations to the truck cab.

Further objects and advantages of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

FIG. 1 is a perspective view of the split-frame system illustrating the front frame, rear frame, interconnecting frame, and hydraulic dampening system;

FIG. 2 is a side view of the split-frame system;

FIG. 7 is a perspective view of the rear frame;

FIG. 8 is a side view of the split-frame system mechanically engaged to a trailer.

DESCRIPTION OF PREFERRED EMBODIMENTS

Figure 3:
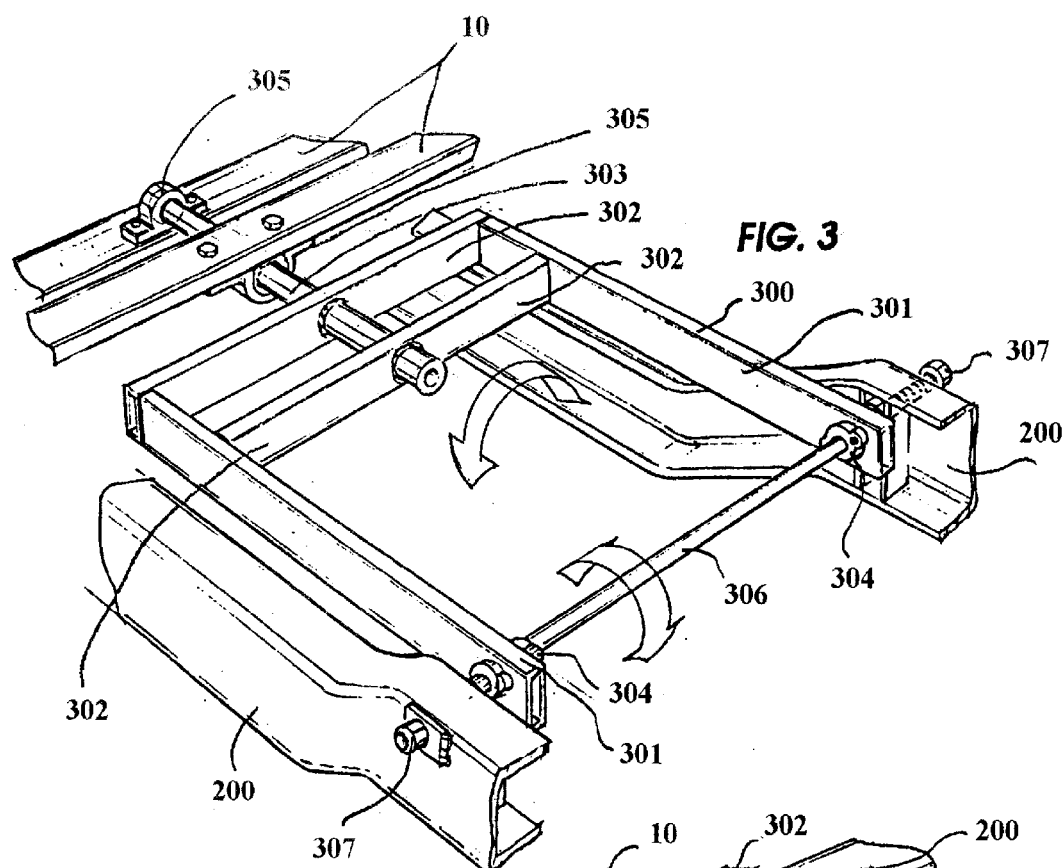
FIG. 3 is a perspective view of the interconnecting frame in engagement with the front and rear frames.

Referring more particularly to the drawings by characters of reference, FIG. 1 discloses a perspective view of the split-frame system 1. The split-frame system 1 is useful for reducing the transmission of vibrations and oscillations from a trailer to a truck cab 11. The split-frame system 1 is comprised of three interconnected frames, a front frame 100, a rear frame 200, and an interconnecting frame 300. These three frames are preferably made of hard alloy steel. The front frame 100 supports a front axle 10, a truck cab 11, an engine 12, and a transmission 13. The front axle 10, having a pair of tires 14 mounted thereon, is positioned on front frame 100 such that the weight of front frame 100 and the components mounted thereon is evenly balanced over the front axle 10.

The rear frame 200 supports a pair of rear axles 20 and a fifth wheel 40. Each rear axle 20 has four tires 14 mounted thereon. Trailers are coupled to the rear frame 200, typically through a coupler such as the fifth wheel 40. The fifth wheel 40 couples to a kingpin of the trailer. In this embodiment, fifth wheel 40 is rigidly mounted to the rear, frame 200. Front axle 10 and rear axles 20 are supported by leaf springs 30 that are mounted on leaf spring joints 31.

The interconnecting frame 300 interlocks the front frame 100 to the rear frame 200 in such a manner that permits the rear frame 200 to rotate about a transverse axis relative to the interconnecting frame 300. In addition, the interconnecting frame 300 interlocks the front frame 100 to the rear frame 200 in such a manner that permits the rear frame 200 to rotate or pivot about its longitudinal axis relative to the front frame 100. In this embodiment, the interconnecting frame 300 is positioned in the interior of the rear frame 200. In an alternative embodiment, disclosed in FIG. 9, the rear frame 200 is mounted on the interior of the interconnecting frame 300.

In order to restrict the degree to which the rear frame 200 can pivot or rotate relative to the front frame 100, a pair of bumpers 60, a left bumper 60A and a right bumper 60B, are provided. Each bumper 60 is made of a solid piece of rubber that is secured to the front frame 100 above the interconnecting frame by a metal bracket 61. The bumpers 60 restrict the degree to which the interconnecting frame 300 may rotate about its longitudinal axis relative to the front frame 100 thereby restricting the degree to which the rear frame 200 may rotate relative to the front frame 100. While two bumpers 60 are used to restrict the degree of rotation of the interconnecting frame 300 relative to the front frame 100 in this embodiment, a total of four bumpers 60 are used in an alternative embodiment. 300, how it is mounted to the front frame 100 and the rear frame 200, and how its motion is restricted by bumpers 60 is provided in FIGS. 3 and 4.

A hydraulic system 50 is provided to dampen the vibrations and oscillations within the split-frame system 1. The hydraulic system 50 is comprised of two hydraulic cylinders 51 mounted to the split-frame system 1 through the use of ball joints 52 and 53. The two hydraulic cylinders 51 are mounted on the left and right sides of the spit-frame system 1. Each hydraulic cylinder 51 is mounted at the top to a rear ball joint 53. Both rear ball joints 53 are secured to the rear frame 200. The base of each hydraulic cylinder 51 is mounted to a front ball joint 52. Both front ball joints 52 are secured to front frame 100. Hydraulic system 50 dampens the rotational vibrations and oscillations of the rear frame 200 along its longitudinal axis relative to front frame 100. In addition, hydraulic dampening system 50 dampens the rotational vibrations and oscillations of the rear frame 200 about a transverse axis along the rear axles 20. The use of ball joints 52 and 53 to mount hydraulic cylinders 51 enables the hydraulic cylinders 51 to adjust position to account for the relative movement of the rear frame 200 with respect to the front frame 100. It is obvious to one skilled in the art that alternative dampening systems and configurations are capable of performing the identical function of the system 50 used in this preferred embodiment. While the hydraulic system 50 introduces a small amount of vibrational coupling between the front and rear frames, 100 and 200, respectively, its use introduces an amount of control in the movement between the two frames.

FIG. 2 discloses a side view of the split frame system 1. When the split-frame system 1 is on a flat surface as shown in FIG. 2, both the front frame 100 and the rear frame 200 are horizontal relative to the ground if a trailer is coupled to the fifth wheel 40. In the event a trailer is not coupled to the fifth wheel 40, the rear frame 200 will not remain horizontal relative to the ground. In this embodiment, the weight of the rear frame 200 and the components mounted thereon is not evenly balanced over the rear axles 20 as the weight of the front frame 100 is evenly balanced over the front axle 10. The center of gravity of the rear frame 200 lies between the end of the rear frame 200 adjacent to the front frame 100 and the pair of rear axles 20. When a trailer is not coupled to the fifth wheel 40, the end of the rear frame 200 adjacent to the front frame 100 will pivot down toward the ground. It is desirable to maintain the rear frame 200 in a horizontal position when a trailer is not coupled to the fifth wheel 40 in order to safely operate the truck 2. Alternatively, the hydraulic system 50 can be used to rigidly lock the rear frame 200 to the front frame 100 by altering the hydraulic pressure within the hydraulic cylinder 51. The rear frame 200 can only pivot with respect to the front frame 100 when the rear frame 200 can compress and extend the hydraulic cylinder 51 with respect to the front frame 100. When sufficient hydraulic pressure is created in the hydraulic cylinders 51 such that the rear frame 200 cannot compress or extend the hydraulic cylinder 51 with respect to the front frame 100, the rear frame 200 is rigidly locked down to the front frame 100.

FIG. 3 illustrates interconnecting frame 300 mechanically engaged with the front frame 100 and rear frame 200. Interconnecting frame 300 is formed in the general shape of a wishbone with two arms 301 attached to two arm braces 302 that are attached to a coupling shaft 303, and two pivot bearings 304. The components of the interconnecting frame 300 are preferably made of a hard steel alloy. The preferred method of attaching arms 301, arm braces 302, and coupling shaft 303 together is welding. Coupling shaft 303 is pivotally attached by two bearing guided pivots 305 to the front frame 100. Coupling shaft 303 defines a longitudinal axis about which interconnecting frame 200 rotates relative to the front frame 100. Arms 301 are rotationally mounted to the rear frame 200 through bearing guided pivots 304. A pivot 304 is secured to each of the two arms 301. Each pivot 304 has a pivot shaft 306 secured to the interconnecting frame 300 that is received by a pivot aperture with a bearing race located in the rear frame 200. Pivot shaft 306 defines a transverse axis about which the rear frame 200 rotates relative to the interconnecting frame 300. In an alternative embodiment, ball joints are used in place of these pivots 304. The pivot shaft 306 is secured to rear frame 200 by caps 307. The interconnecting frame 300 attaches front frame 100 to rear frame 200 while permitting rear frame 200 to rotate longitudinally and transversely relative to the front frame 100.

Figure 4:
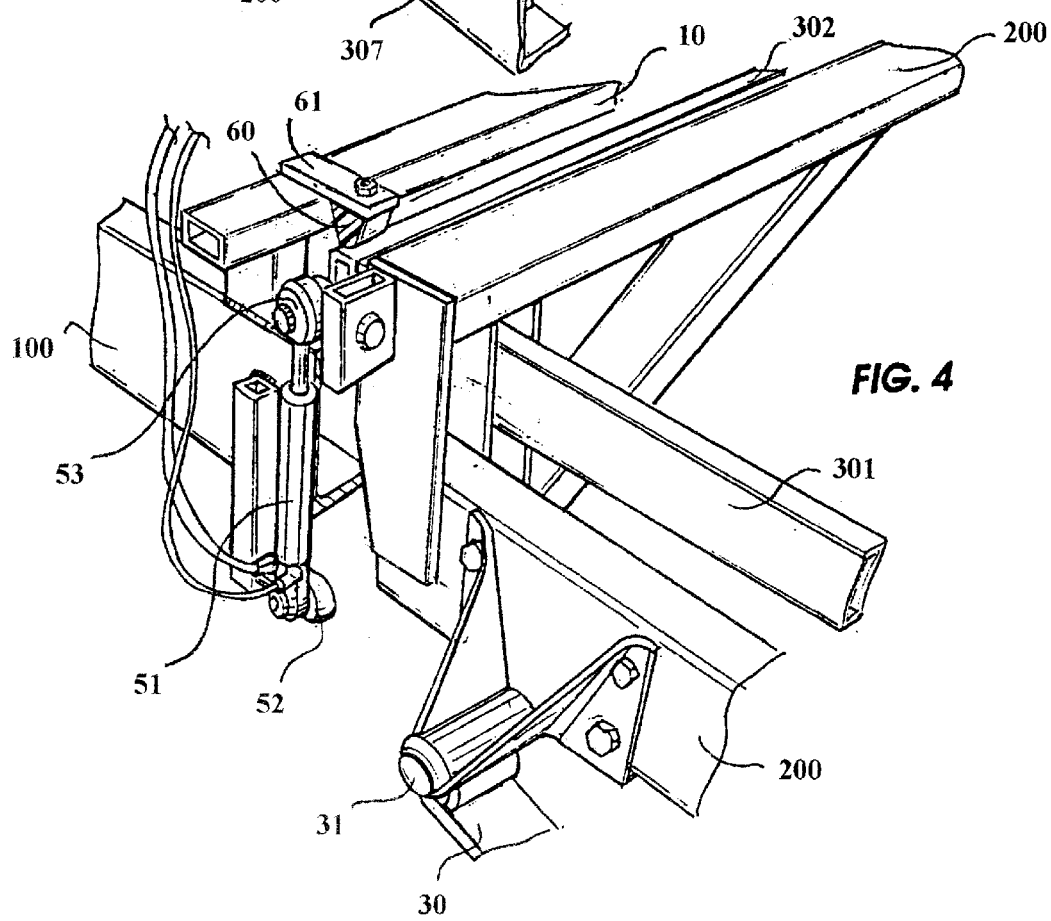
FIG. 4 is a perspective view of the left side of the split-frame system illustrating the hydraulic dampening system.

The split-frame system 1 is provided with a hydraulic system 50 to dampen the vibrations and oscillations of the rear frame 200 relative to the front frame 100. FIG. 4 illustrates a perspective view of the hydraulic cylinder 51 mounted on the left side of the split-frame system 1. The hydraulic cylinder 51 is mounted at the top to a rear ball joint 53. The rear ball joint 53 is rigidly secured to the rear frame 200. The base of hydraulic cylinder 51 is mounted to front ball joint 52. The front ball joint 52 is rigidly secured to front frame 100. The use of ball joints permits the hydraulic cylinder 51 to alter position in relation to the relative motion between the front frame 100 and the rear frame 200.

Also visible in FIG. 4 is one of the two bumpers 60. The bumper 60 is rigidly mounted to the front frame 100 by bracket 61. When the interconnecting frame 300 rotates a sufficient amount in a clockwise direction about shaft 303, the upper left end of arm brace 302 will impact against bumper 60. In the alternative embodiment where four bumpers 60 are used, the bottom right end of arm brace 302 would impact against the bumper 60 mounted to the right side of the split-frame system 1 to front frame 100 below the interconnecting frame 300 as the upper left end of arm brace 302 impacts against the bumper 60 shown in FIG. 4. While these bumpers 60 do partially couple the front frame 100 to the rear frame 200, the interconnecting frame 300 has sufficient freedom to rotate relative to the front frame 100 to account for the trailer vibrations and oscillations caused by most minor road imperfections. Therefore, the vibrations and oscillations of the trailer caused by minor road imperfections are not transferred to the truck cab 11.

Figure 5:
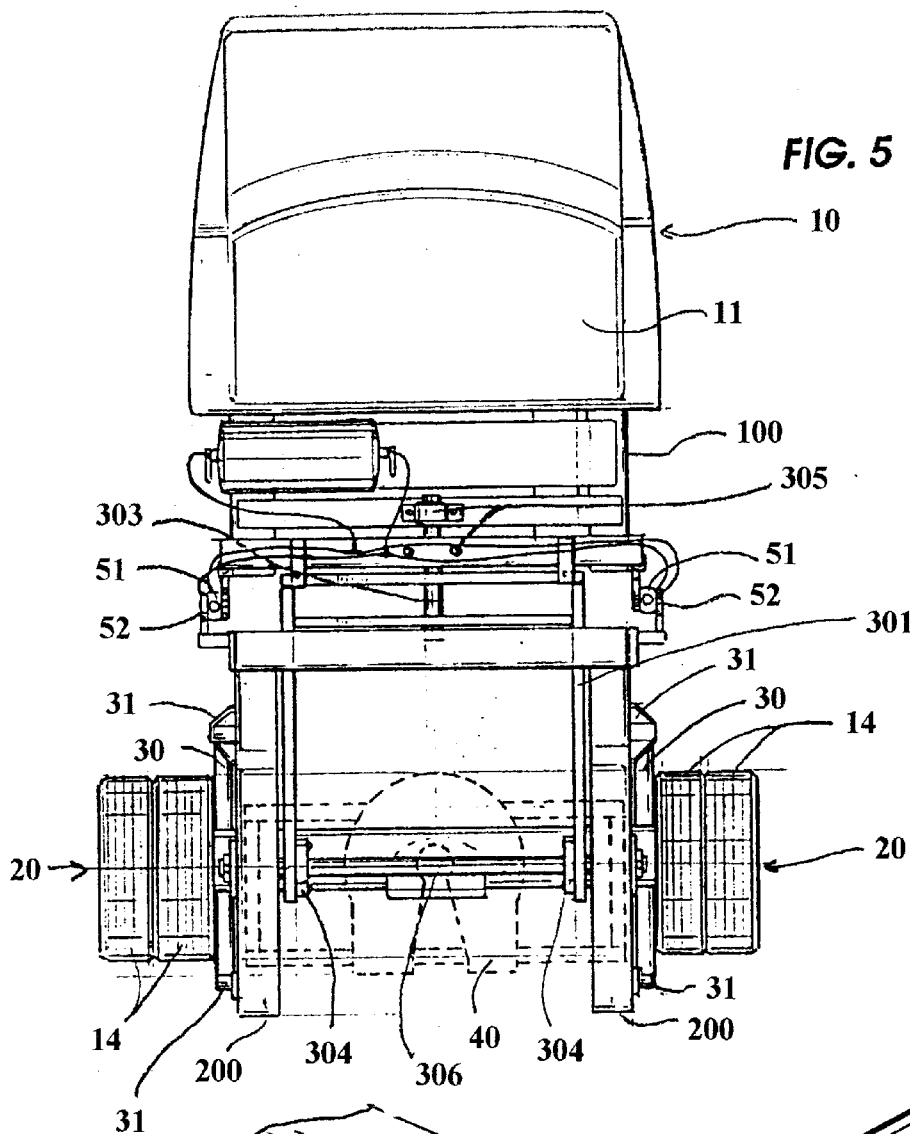
FIG. 5 is a top view of the split frame system.

A top view of the split-frame system 1 is disclosed in FIG. 5. In this embodiment, the interconnecting frame 300 is configured to fit within the interior of rear frame 200. Interconnecting frame arms 301 pivotally mount to the rear frame 200 on the interior of rear frame 200. In an alternative embodiment, the interconnecting frame 300 is configured to attach to the rear frame 200 on the exterior of rear frame 200. In this alternative embodiment, arms 301 are positioned on the exterior of rear frame 200. In contrast to the pivot shaft 306 used to secure the interconnecting frame 300 to the rear frame 200 in the preferred embodiment, the alternative embodiment employs ball joints to pivotally secure arms 301 to the exterior of rear frame 200.

The rear frame 200 is free to pivot only about a transverse axis relative to the interconnecting frame. The rear frame 200 is rigidly secured to the interconnecting frame 300 with respect to all other degrees of freedom. When a trailer experiences vibrations and oscillations about its longitudinal axis due to minor road imperfections, the trailer will transmit these vibrations to the rear frame 200 due to its coupling with the fifth wheel 40. The rear frame 200, secured to the frame arms 301, will vibrate and oscillate with the trailer about the coupling shaft 303. Since the coupling shaft 303 is pivotally mounted to the front frame 100 by the two bearing guided pivots 305, the longitudinal vibrations experienced by the rear frame 200 are not transmitted to the front frame 100. The hydraulic cylinders 51 dampen this longitudinal vibrational motion of the rear frame 200 about its longitudinal axis relative to the front frame 100. The two bumpers 60 limit the degree to which the interconnecting frame 300 can pivot or rotate relative to the front frame 100. The bumpers 60 permit the interconnecting frame 300 to freely pivot for the small angular vibrations and oscillations caused by most minor road imperfections. However, the interconnecting frame 300 will impact bumpers 60 and transmit vibrations to the front frame 100 when large road obstructions cause the rear frame 200 to experience large rotational vibrations.

Similarly, when a pair of rear axles of the trailer encounters minor road imperfection, the front end of the trailer will rotationally oscillate about a transverse axis. The trailer, coupled to the fifth wheel 40, will cause the rear frame 200 to also rotationally oscillate about a transverse axis. Due to the fact that the rear frame 200 is free to transversely pivot about pivot shaft 306, these transverse rotational vibrations are not transmitted from the rear frame 200 to the front frame 100. Hydraulic cylinders 51, secured to the front and rear frames 100 and 200 as previously described, dampen this rotational transverse vibration between the rear frame 200 and the front frame 100.

Figure 6:
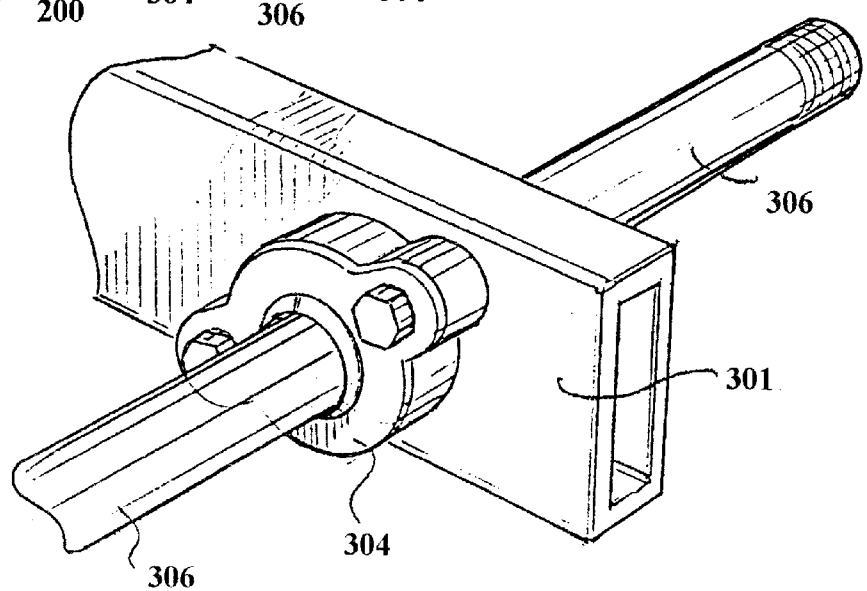
FIG. 6 is a perspective view of the left mechanical joint between the interconnecting frame and the rear frame.

A perspective view of one of the two identical pivotal joints between the interconnecting frame 300 and the rear frame 200 is shown in FIG. 6. A bearing guided pivot 304 is bolted to arm 301. A person skilled in the art may secure the pivot 304 to arm 301 by other convention al means such as welding. Pivot shaft 306 is rotationally coupled to the bearing guided pivot 304. The pivot shaft 306, as previously noted, is secured to rear frame 200.

FIG. 7 discloses a perspective view of the rear frame 200. This figure discloses the preferred embodiment of the invention where the interconnecting frame 300 is positioned within the interior of rear frame 200. The arms 301 of interconnecting frame 300 having bearing guided pivots 304 mounted thereon are visible within the interior of rear frame 200 below the fifth wheel 40. As described earlier, the fifth wheel 40 is rigidly secured to the rear frame 200. The pivot shaft 306 that rotationally mounts the interconnecting frame 300 to the rear frame 200 is fixed to the rear frame 200 in this embodiment through the use of threaded nuts 307. Other conventional means such as welding may be used to secure the pivot shaft 306 to the rear frame 200.

A side view of the split-frame system 1 illustrating a trailer 80 coupled to the fifth wheel 40 is disclosed in FIG. 8. When the rear wheels of the trailer 80 impact a minor road obstruction, the rear portion of the trailer will vertically oscillate causing the front portion of the trailer 80 to rotationally oscillate about the rear axle 20 as shown by the arrows in this figure. In addition, the trailer 80 will cause the rear frame 200 to rotationally oscillate in a similar manner due to its coupling with the fifth wheel 40. The pivotal mounting between the rear frame 200 and the interconnecting frame 300 prevents the transmission of the rotational oscillations from the rear frame 200 to the front frame 100. These oscillations experienced by the rear frame 200 are dampened by the hydraulic cylinder 51.

Figure 9:
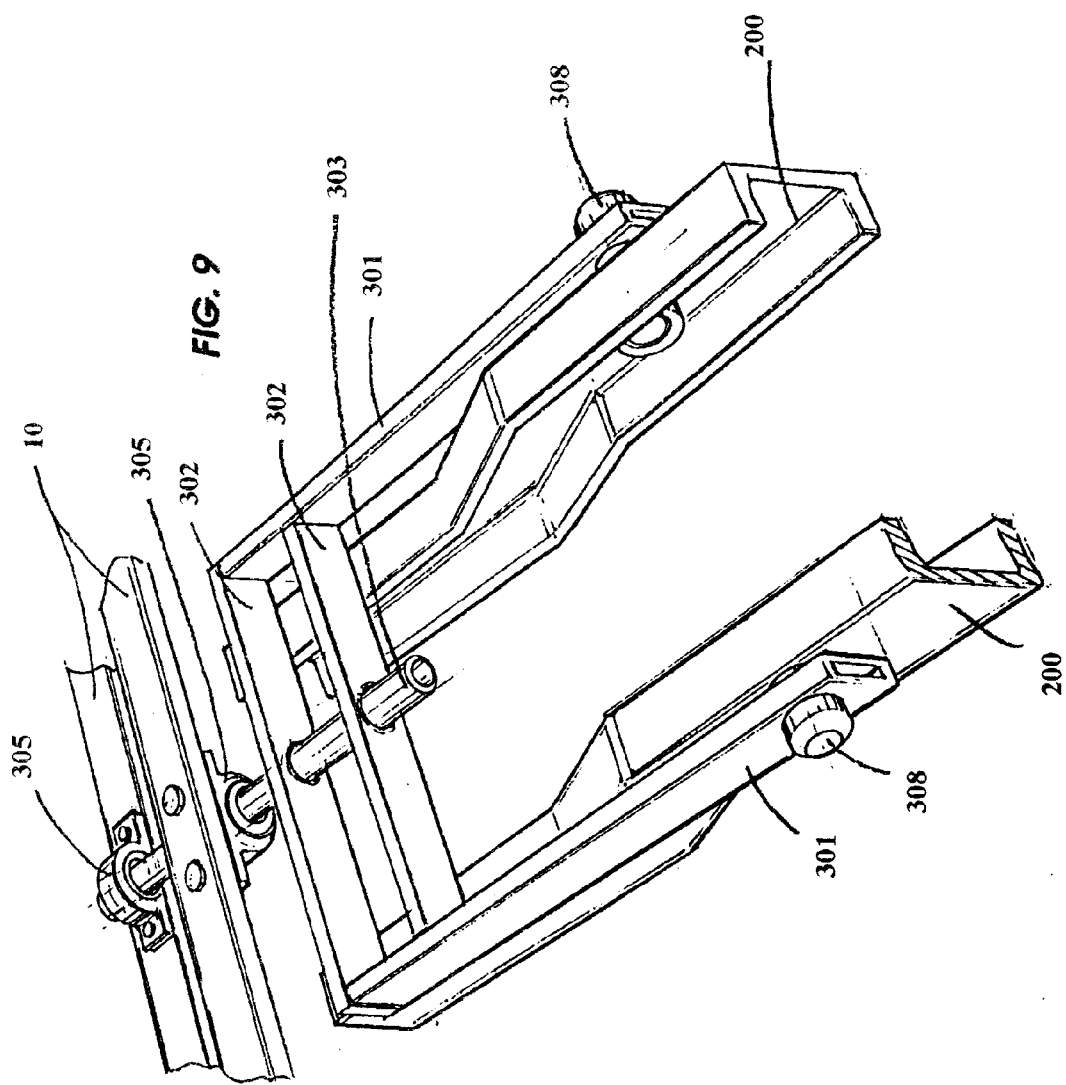
FIG. 9 is a perspective view of an alternative embodiment for the configuration of the interconnecting frame and the rear frame.

An alternative embodiment for the structure of the rear frame 200 and the interconnecting frame 300 is disclosed in FIG. 9. The interconnecting frame 300 interlocks the front frame 100 to the rear frame 200 in such a manner that permits the rear frame 200 to rotate about a transverse axis relative to the interconnecting frame 300. In addition, the interconnecting frame 300 interlocks the front frame 100 to the rear frame 200 in such a manner that permits the rear frame 200 to rotate or pivot about its longitudinal axis relative to the front frame 100. In this embodiment, the interconnecting frame 300 is positioned on the exterior of the rear frame 200. Ball joints 308 are used to pivotally mount the interconnecting frame 300 to the rear frame 200.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A split-frame system for a truck transporting a trailer comprising:

a front frame;

a rear frame;

an interconnecting frame having a front end and a rear end, the rear end of said interconnecting frame pivotally mounting to said rear frame, the front end of said interconnecting frame pivotally mounting to said front frame, whereby said rear frame can pivot about a transverse axis of said rear frame relative to said interconnecting frame and pivot about a longitudinal axis of said interconnecting frame relative to said front frame; and a dampening device having a top end and a bottom end, the top end of said dampening device pivotally mounting to said rear frame, the bottom end of said dampening device pivotally mounting to said front frame.

2. The split-frame system for a motor vehicle transporting a trailer, as recited in claim 1, further comprising a left bumper and a right bumper, said left bumper is secured to a left side of said front frame, said right bumper is secured to a right side of said front frame, whereby said left bumper and said right bumper limit the range of rotation of said interconnecting frame.

3. The split-frame system for a motor vehicle transporting a trailer, as recited in claim 2, wherein said rear frame has an interior and a transversely mounted pivot shaft, said interconnecting frame pivotally mounting to said pivot shaft within said interior of said rear frame.

4. The split-frame system for a motor vehicle transporting a trailer, as recited in claim 2, wherein said interconnecting frame has an interior, said rear frame pivotally mounting to said interconnecting frame within said interior.

5. The split-frame system for a motor vehicle transporting a trailer, as recited in claim 4, wherein said rear frame is pivotally mounted to said interconnecting frame by a ball joint.

* * * * *